(12) United States Patent
Kikkawa et al.

(10) Patent No.: US 8,255,579 B2
(45) Date of Patent: Aug. 28, 2012

(54) DEVICE CONTROL APPARATUS AND DEVICE CONTROL METHOD IN VIDEO IMAGE DISPLAY SYSTEM INCLUDING A PLURALITY OF CONNECTED DEVICES

(75) Inventors: Teruki Kikkawa, Yokohama (JP); Michihiro Izumi, Kashiwa (JP); Yoshikazu Shibamiya, Tokyo (JP); Yasushi Shikata, Tama (JP); Hirofumi Urabe, Kawasaki (JP); Daisuke Takayanagi, Kawasaki (JP); Chika Masuda, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/990,304

(22) PCT Filed: May 18, 2009

(86) PCT No.: PCT/JP2009/059468
§ 371 (c)(1),
(2), (4) Date: Oct. 29, 2010

(87) PCT Pub. No.: WO2009/145121
PCT Pub. Date: Dec. 3, 2009

(65) Prior Publication Data
US 2011/0066759 A1   Mar. 17, 2011

(30) Foreign Application Priority Data
May 27, 2008 (JP) .................. 2008-138344

(51) Int. Cl.
*G06F 3/00* (2006.01)
*G06F 13/00* (2006.01)

(52) U.S. Cl. .......... 710/8; 710/5; 710/14; 710/33; 710/36

(58) Field of Classification Search .......... None
See application file for complete search history.

(56) References Cited

U.S. PATENT DOCUMENTS
6,795,130 B2   9/2004   Shibamiya
(Continued)

FOREIGN PATENT DOCUMENTS
JP   2007-78980 A   3/2007
WO   2008/020401 A2   2/2008

OTHER PUBLICATIONS
Chris Sterzik, CEC to I2C Bridge With the MSP430, Dec. 2007, Texas Instruments, [online, accessed on Nov. 7, 2011], URL: http://www.ti.com/lit/an/slaa377/slaa377.pdf.*

(Continued)

*Primary Examiner* — Scott Sun
(74) *Attorney, Agent, or Firm* — Fitzpatrick, Cella, Harper & Scinto (57) ABSTRACT

A device control apparatus in a video image display system including a plurality of connected devices. The apparatus includes an obtaining unit which obtains a logical address of a first device connected to the device control apparatus as a control object, a specifying unit which specifies the device type of the first device if the obtained logical address of the first device is not a logical address according to the device type, a selection unit which selects a second device which is connected to the device control apparatus and is of the same device type as the first device, and a control unit which controls a logical address assigned to the selected second device according to the device type thereof so that the first device obtains a logical address.

14 Claims, 12 Drawing Sheets

U.S. PATENT DOCUMENTS

| | | |
|---|---|---|
| 7,464,397 B2 | 12/2008 | Kikkawa et al. |
| 7,600,244 B2 | 10/2009 | Maruyama et al. |
| 7,620,969 B2 | 11/2009 | Shibamiya et al. |
| 2003/0208778 A1 | 11/2003 | Aratani et al. |
| 2005/0169685 A1 | 8/2005 | Matsubayashi et al. |
| 2007/0057931 A1 | 3/2007 | Takamori |
| 2007/0188659 A1 | 8/2007 | Matsumoto et al. |
| 2008/0151113 A1* | 6/2008 | Park .............................. 348/500 |
| 2008/0282292 A1 | 11/2008 | Ohno et al. |
| 2008/0320539 A1 | 12/2008 | Ohkita |
| 2009/0049205 A1* | 2/2009 | Park .................................. 710/4 |
| 2009/0116821 A1 | 5/2009 | Shibamiya et al. |

OTHER PUBLICATIONS

Sep. 29, 2009 International Search Report and Written Opinion in PCT/JP2009/059468.

Hitachi, et al., "High definition Multimedia Interface—Specification Version 1.3a", High-Definition Multimedia Interface, [online] XP002491706; Retrieved from the Internet: URL:http://www.hdmi.org/download/HDMISpecification13a.pdf> [retrieved on Nov. 10, 2006].

Sep. 2, 2010 International Preliminary Report on Patentability in PCT/JP2009/059468.

* cited by examiner

| HEADER BLOCK (10 BITS) | | | | | | | | | |
|---|---|---|---|---|---|---|---|---|---|
| 1 | 2 | 3 | 4 | 5 | 6 | 7 | 8 | – | – |
| INITIATOR | | | | DESTINATION | | | | EOM | ACK |

FIG. 6

| DATA BLOCK (10 BITS) | | | | | | | | | |
|---|---|---|---|---|---|---|---|---|---|
| 1 | 2 | 3 | 4 | 5 | 6 | 7 | 8 | – | – |
| INFORMATION BIT (OPCODE/OPERAND) | | | | | | | | EOM | ACK |

| DISPLAY NAME | PHYSICAL ADDRESS | LOGICAL ADDRESS | POLLING MESSAGE | DEVICE TYPE |
|---|---|---|---|---|
| DVD PLAYER | 1.0.0.0 | 4 | 4 | PLAYBACK DEVICE |
| GAME DEVICE | 2.0.0.0 | 8 | 4→8 | PLAYBACK DEVICE |
| CAMERA | 3.0.0.0 | 11 | 4→8→11 | PLAYBACK DEVICE |
| CAMCORDER | 4.0.0.0 | 15 | 4→8→11→15 | PLAYBACK DEVICE |

| DISPLAY NAME | PHYSICAL ADDRESS | LOGICAL ADDRESS | POLLING MESSAGE | DEVICE TYPE | STATE | USE FREQUENCY | OPERATION FREQUENCY |
|---|---|---|---|---|---|---|---|
| DVD PLAYER | 1.0.0.0 | 4 | 4 | PLAYBACK DEVICE | STANDBY | LOW | LOW |
| GAME DEVICE | 2.0.0.0 | 8 | 4→8 | PLAYBACK DEVICE | STANDBY | HIGH | HIGH |
| CAMERA | 3.0.0.0 | 11 | 4→8→11 | PLAYBACK DEVICE | ON | HIGH | HIGH |
| CAMCORDER | 4.0.0.0 | 15 | 4→8→11→15 | PLAYBACK DEVICE | ON | – | UNDEFINED |

| ADDRESS | DEVICE |
|---|---|
| 0 | TV |
| 1 | RECORDING DEVICE 1 |
| 2 | RECORDING DEVICE 2 |
| 3 | TUNER 1 |
| 4 | PLAYBACK DEVICE 1 |
| 5 | AUDIO SYSTEM |
| 6 | TUNER 2 |
| 7 | TUNER 3 |
| 8 | PLAYBACK DEVICE 2 |
| 9 | RECORDING DEVICE 3 |
| 10 | TUNER 4 |
| 11 | PLAYBACK DEVICE 3 |
| 12 | RESERVED |
| 13 | RESERVED |
| 14 | FREE USE |
| 15 | UNREGISTERED (AS INITIATOR ADDRESS) BROADCAST (AS DESTINATION ADDRESS) |

DEVICE CONTROL APPARATUS AND DEVICE CONTROL METHOD IN VIDEO IMAGE DISPLAY SYSTEM INCLUDING A PLURALITY OF CONNECTED DEVICES

TECHNICAL FIELD

The present invention relates to a device control apparatus and a device control method in a video image display system including a plurality of connected devices.

BACKGROUND ART

In recent years, the High-Definition Multimedia Interface (HDMI) is available that connects a video signal output apparatus, such as a camcorder, a video recorder or a tuner, and a video image display apparatus, such as a television, through one cable, and that can effect collaboration control between the apparatuses.

The HDMI is a standard extended from the preceding Digital Visual Interface (DVI) standard by arranging a function to transmit audio data as well as video data, a copyright protecting function and a color difference transmitting function for home-use AV appliances.

The video signal output apparatus is capable of obtaining information on the display performance of the connected video image display apparatus through Digital Data Channel (DDC) communication specified in the HDMI and is also capable of obtaining the address of the HDMI terminal of the connected video image display apparatus.

Also, the video image display apparatus can make, by high/low control in Hot Plug Detect (HPD) specified in the HDMI, the video signal output apparatus execute processing for DDC communication. According to Japanese Patent Application Laid-Open No. 2007-078980, the video signal output apparatus is reset by HPD control to re-obtain Extended Display Identification Data (EDID) when the video signal output apparatus transmits data other than EDID descriptions to the video image display apparatus.

Further, HDMI Ver. 1.2 and the subsequent versions have an additional function, called Consumer Electronics Control (CEC), which is capable of collaboration control between the video image display apparatus and the video signal output apparatus.

Not only the video signal output apparatus that outputs a video signal but also a video recording apparatus or the like can be CEC-controlled. According to the HDMI standard, such an audiovisual device obtains one of logical addresses 0 to 15. The video image display apparatus can control, by using the logical address, the audiovisual device to be controlled (High-Definition Multimedia Interface Specification Ver. 1.3, Nov. 10, 2006, Supplement 1).

In the HDMI standard, however, there is a limit to the number of addresses obtainable by audiovisual devices (hereinafter referred to simply as "device") connected to the video image display apparatus, and the upper limit of the number of addresses is determined according to a kind of device (device type). For example, only three devices corresponding to Playback Device (reproducing apparatus) can obtain logical addresses. If a fourth Playback Device is connected, it obtains a logical address non-compatible with CEC control (indefinite address). The video image display apparatus cannot CEC-control the device that has obtained the indefinite address.

The technique described in Japanese Patent Application Laid-Open No. 2007-078980 relates to processing by which the video signal output apparatus is reset to re-obtain EDID, but it is a technique devised without considering CEC control on a device having an indefinite address obtained. Therefore the technique is incapable of solving the above-described problem.

While the problem has been described with respect to the HDMI standard by way of example, the problem is not limited to the one with the HDMI standard. The above-described problem also exists with whole video image display system that is capable of the collaboration control among devices and has the determined number of assignable logical numbers.

DISCLOSURE OF THE INVENTION

An aspect of the present invention is to enable control on a device even if any logical address usable for device control is not assigned to the device.

In order to solve the above-described problem, according to an aspect of the present invention, a device control apparatus in a video image display system which includes a plurality of connected devices and is arranged to control each of the connected devices by assigning a logical address according to the device type of the device, an upper limit of the number of assignable logical addresses being determined with respect to each device type, comprises an obtaining unit which obtains a logical address of a first device connected to the device control apparatus as a control object, a specifying unit which specifies the device type of the first device if the first logical address obtained is not a logical address according to the device type, a selection unit which selects a second device which is connected to the device control apparatus and is of the same device type as the first device, and a control unit which controls a logical address assigned to the selected second device according to the device type thereof so that the first device obtains a logical address.

According to another aspect of the present invention, a device control method in a video image display system including a device control apparatus and a plurality of devices connected to the device control apparatus and being arranged to control each of the devices connected to the device control apparatus by assigning a logical address according to the device type of the device, an upper limit of the number of assignable logical addresses being determined with respect to each device type, comprises the steps of obtaining a logical address of a first device connected to the device control apparatus as a control object, specifying the device type of the first device if the first logical address obtained is not a logical address according to the device type, selecting a second device which is connected to the device control apparatus and is of the same device type as the first device, and controlling a logical address assigned to the selected second device according to the device type thereof so that the first device obtains a logical address.

According to the present invention, even if there exist a device to which any logical address usable for device control is not assigned, the device can be controlled.

Further features of the present invention will become apparent from the following description of exemplary embodiments with reference to the attached drawings.

BEST MODES FOR CARRYING OUT THE INVENTION

Exemplary embodiments of the present invention will be illustratively described in detail with reference to the drawings.

First Embodiment

Modes for carrying out the present invention will be illustratively described with reference to the drawings. However, it is not to be construed that the scope of the present invention is limited to the functions, shapes and relative placements of components described in exemplary embodiments, unless otherwise specifically described. Also, the functions, shapes, etc., of components described once in the following description are assumed to be the same as originally described, unless otherwise specified.

Figure 1:
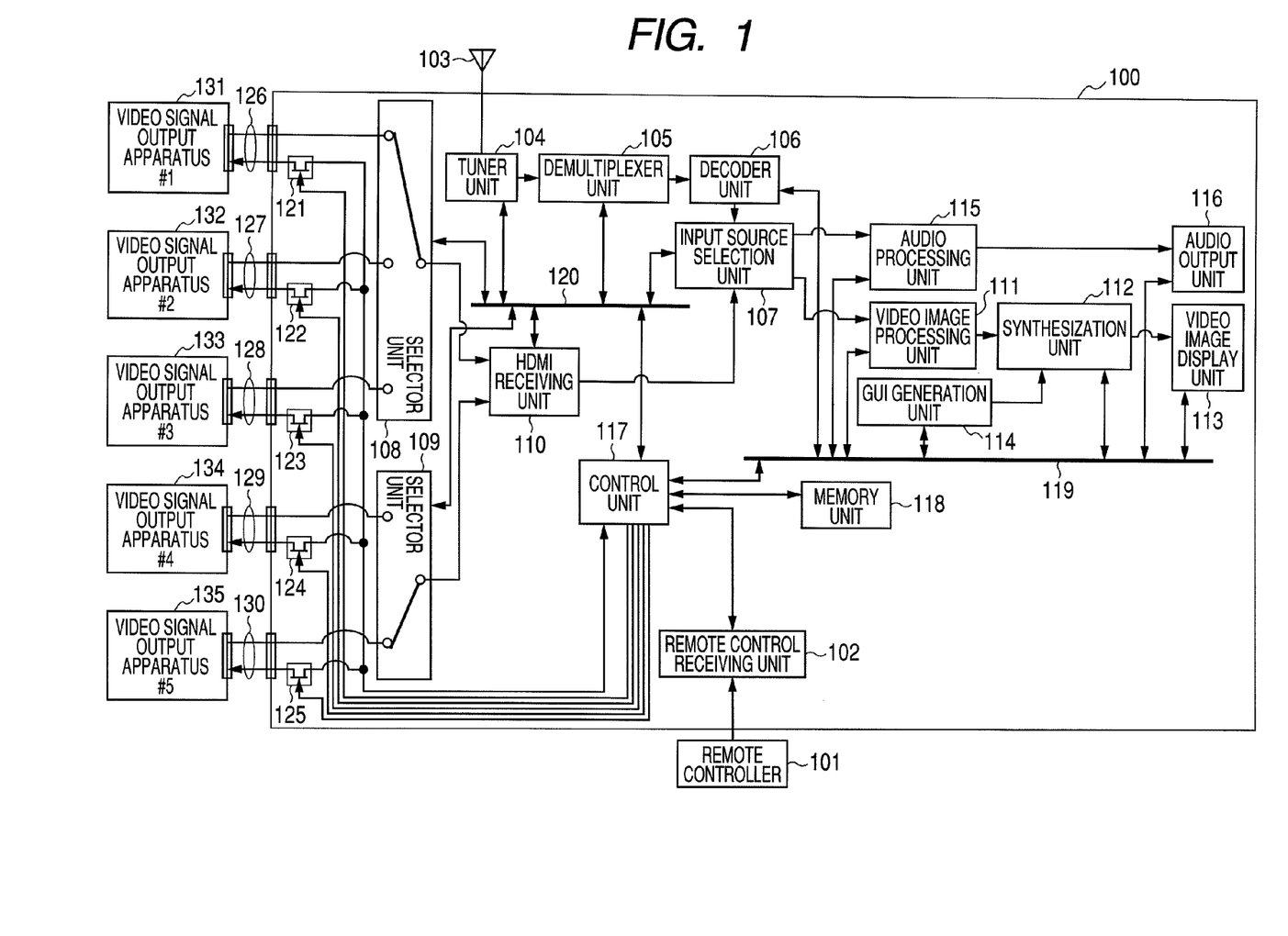
FIG. 1 is a block diagram of a video image display system according to a first embodiment.

FIG. 1 is a block diagram illustrating a video image display system to which the present invention can be applied.

Referring to FIG. 1, a video image display apparatus 100 and video signal output apparatuses 131 to 135 are connected to each other via connection lines (hereinafter referred to as HDMI cables) 126 to 130 conforming to the High Definition Multimedia Interface (HDMI) standard.

Configuration of Vide Image Apparatus

The video image display apparatus 100 includes a remote control receiving unit 102, a tuner unit 104, a demultiplexer unit 105, a decoder unit 106, selector units 108 and 109, an HDMI receiving unit 110, an input source selection unit 107, a video image processing unit 111, a GUI generation unit 114, a synthesization unit 112, a video image display unit 113, an audio processing unit 115, an audio output unit 116, and bus switches 121 to 125.

The video image display apparatus 100 is a television which displays a video image input in digital form and outputs audio, and which is, for example, a cathode ray tube (CRT), a liquid crystal television or a plasma television.

The remote control receiving unit 102 receives a remote control signal from a remote controller 101.

The tuner unit 104 performs processing including demodulation and error correction on a television broadcast signal input through an antenna 103 to generate a transport stream (TS), descrambles the generated TS and outputs the descrambled TS to the demultiplexer unit 105.

The demultiplexer unit 105 extracts video data and audio data from TSs in a plurality of channels input from the tuner unit 104, and outputs the extracted data to the decoder unit 106. The video data and audio data processed in the decoder unit 106 are output to the input source selection unit 107.

The selector units 108 and 109 select video data and audio data from the plurality of video signal output apparatuses connected to the video image display apparatus 100.

The HDMI receiving unit 110 converts, by an HDMI signal receiving interface, video data and audio data input from the selector units 108 and 109 into a desired format and outputs the data in the desired format to the input source selection unit 107.

The input source selection unit 107 selects video data and audio data to be displayed and output between the input from the tuner unit 104 receiving broadcast waves and the input from the HDMI receiving unit 110, and outputs the selected video and audio data to the video image processing unit 111 and the audio processing unit 115.

The video image processing unit 111 performs image quality processing or the like on the input video data and outputs the processed data to the synthesization unit 112.

The GUI generation unit 114 generates a menu screen and a connection device list described below and outputs the menu screen and the connection device list to the synthesization unit 112.

The synthesization unit 112 synthesizes image data input from the video processing unit 111 and image data input from the GUI generation unit 114 and outputs the synthesized image data to the video image display unit 113. This image data is displayed by the video image display unit 113.

The audio processing unit 115 performs desired audio processing on the input audio data and outputs the processed data to the audio output unit 116. This audio data is output as sound by the audio output unit 116.

A control unit 117 controls the entire display apparatus. The control unit 117 is, for example, a central processing unit (CPU).

In the present invention, the bus switches 121 to 125 are provided in connection lines (CEC lines) from HDMI terminals, and the control unit 117 can electrically switch over connection/disconnection between two ends of each switch.

Configuration of Video Signal Output Apparatus

Figure 2:
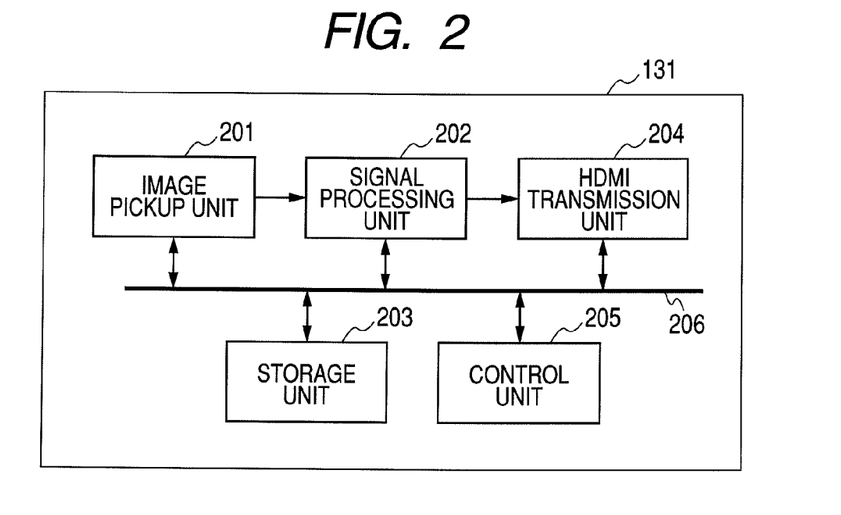
FIG. 2 is a block diagram of a video signal output apparatus according to the first embodiment.

FIG. 2 is a block diagram showing the configuration of video signal output apparatuses 131 to 135. The video signal output apparatuses are apparatuses capable of outputting video data, including, for example, a camcorder, a DVD player, a video player and a game machine. A camcorder will be described by way of example. A camcorder includes an image pickup unit 201, a signal processing unit 202, a storage unit 203, an HDMI transmission unit 204, and a control unit 205.

The image pickup unit 201 has an image pickup lens and an image pickup device. An output signal from the image pickup device is A/D converted and input to the signal processing unit 202.

The signal processing unit 202 includes a level correction unit, a white balance correction unit, a γ correction unit, a color processing unit, a color difference conversion unit and an encoding/decoding unit. The signal processing unit 202 performs encoding processing on a signal input from the image pickup unit 201, and stores processed contents in the storage unit 203. Also, when the stored contents are to be output to the outside, the signal processing unit 202 reads out the contents from the storage unit 203, performs decoding processing on the contents and inputs the decoded contents to the HDMI transmission unit 204.

The storage unit 203 manages directory information and format information on stored contents and image sizes as a contents profile.

The HDMI transmission unit 204 sends out video data and audio data by a method described below.

The control unit 205 controls the entire video signal output apparatus 131.

Configuration of HDMI

Figure 3:
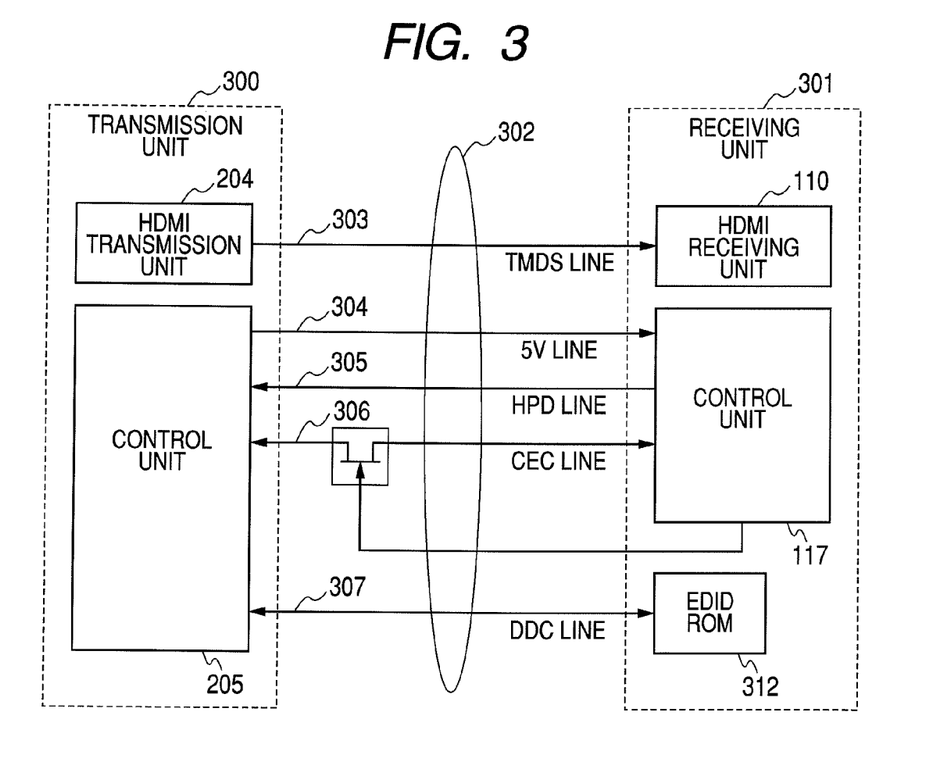
FIG. 3 is a diagram illustrating the configuration of HDMI.

FIG. 3 is a diagram illustrating the configuration of the HDMI.

A transmission unit 300 is provided in devices such as a camcorder and a DVD player existing as video/audio sources (video signal output apparatuses 131 to 135), while a receiving unit 301 is provided in a device such as a display which outputs video/audio (video image display apparatus 100). More specifically, the transmission unit 300 includes an HDMI transmission unit 204 and a control unit 205, and the receiving unit 301 includes an HDMI receiving unit 110, a control unit 117 and an EDID-ROM 312. Connections are made between the transmission unit 300 and the receiving unit 301 through an HDMI cable 302.

The transmission unit 300 supplies a 5 V power signal to a 5 V line 304 when using a TMDS line 303 or a DDC line 307.

The receiving unit 301 detects the connection of the transmission unit 300 from the supply of the 5 V power signal and initializes the EDID (Extended Display Identification Data)-ROM 312. In the EDID-ROM 312, information on the display performance of the receiving unit 301 and physical address information for recognition of connection ports is stored. The HDMI receiving unit 110 supplies an HPD signal to a Hot Plug Detect (HPD) line 306 after the completion of initialization.

By being supplied with the HPD signal, the transmission unit 300 obtains through a Display Data Channel (DDC) line 307 the information written in the EDID-ROM 312.

The HDMI transmission unit 204 performs Transition Minimized Differential Signaling (TMDS) encoding of video data and audio data and outputs the encoded date in a form suitable for high-speed transmission to the TMDS line 303. For example, the HDMI transmission unit 204 converts video data of parallel 8 bits×3 channels into serial 10 bits×3 channels and converts audio data of parallel 4 bits into serial 10 bits.

The HDMI receiving unit 110 performs TMDS decoding of received video data and audio data and outputs baseband video data and baseband audio data. With respect to the above-described example, the HDMI receiving unit 110 converts video data of serial 10 bits×3 channels into parallel 8 bits×3 channels and converts audio data of serial 10 bits into parallel 8 bits. The control units 205 and 117 integratively control the transmission unit 300 and the receiving unit 301, respectively.

Figure 4:
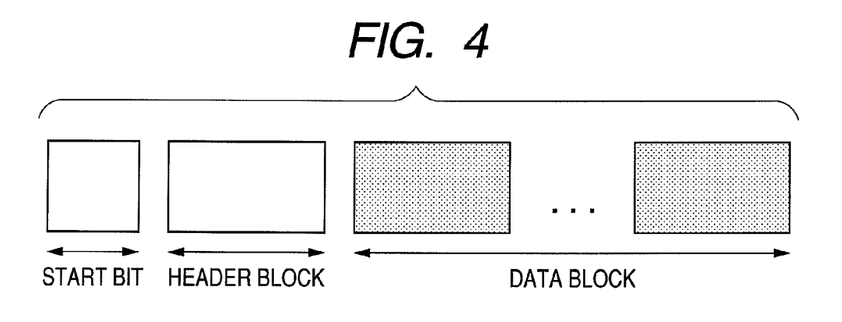
FIG. 4 is a diagram illustrating a CEC command frame.
Figure 5:
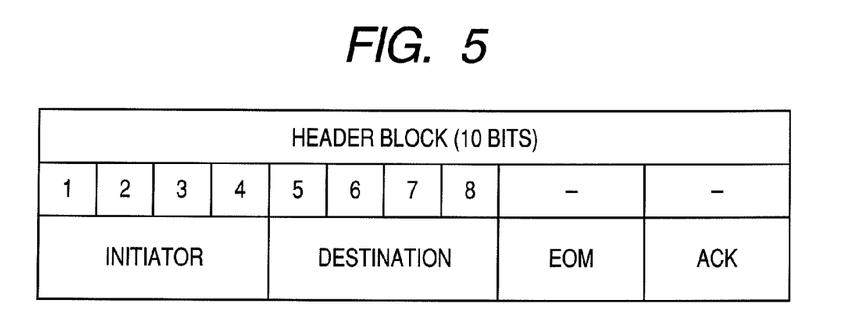
FIG. 5 is a diagram illustrating a header block of a CEC command.
Figure 6:
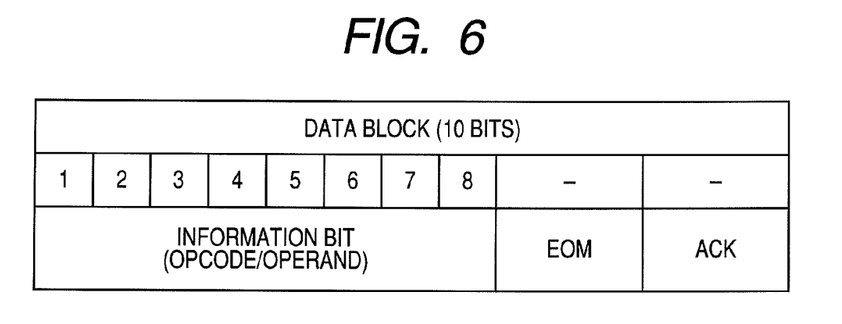
FIG. 6 is a diagram illustrating a data block of a CEC command.

A Consumer Electronics Control (CEC) line 306 is a device control line through which commands capable of controlling the device (hereinafter referred to as CEC commands) can be transmitted and received between the transmission unit 300 and the receiving unit 301. CEC command frame FIG. 4 illustrates a CEC command frame, FIG. 5 a header portion, and FIG. 6 the format of a data block portion. The CEC command has a maximum length of 16×10 bits. The header portion includes logical addresses indicating a source and a destination. The data portion includes an opcode indicating details of control and an operand indicating control parameters.

System Operation

The operation of the video image display system having the above-described configuration will be described.

1. Logical Address Determination Processing

Figure 7:
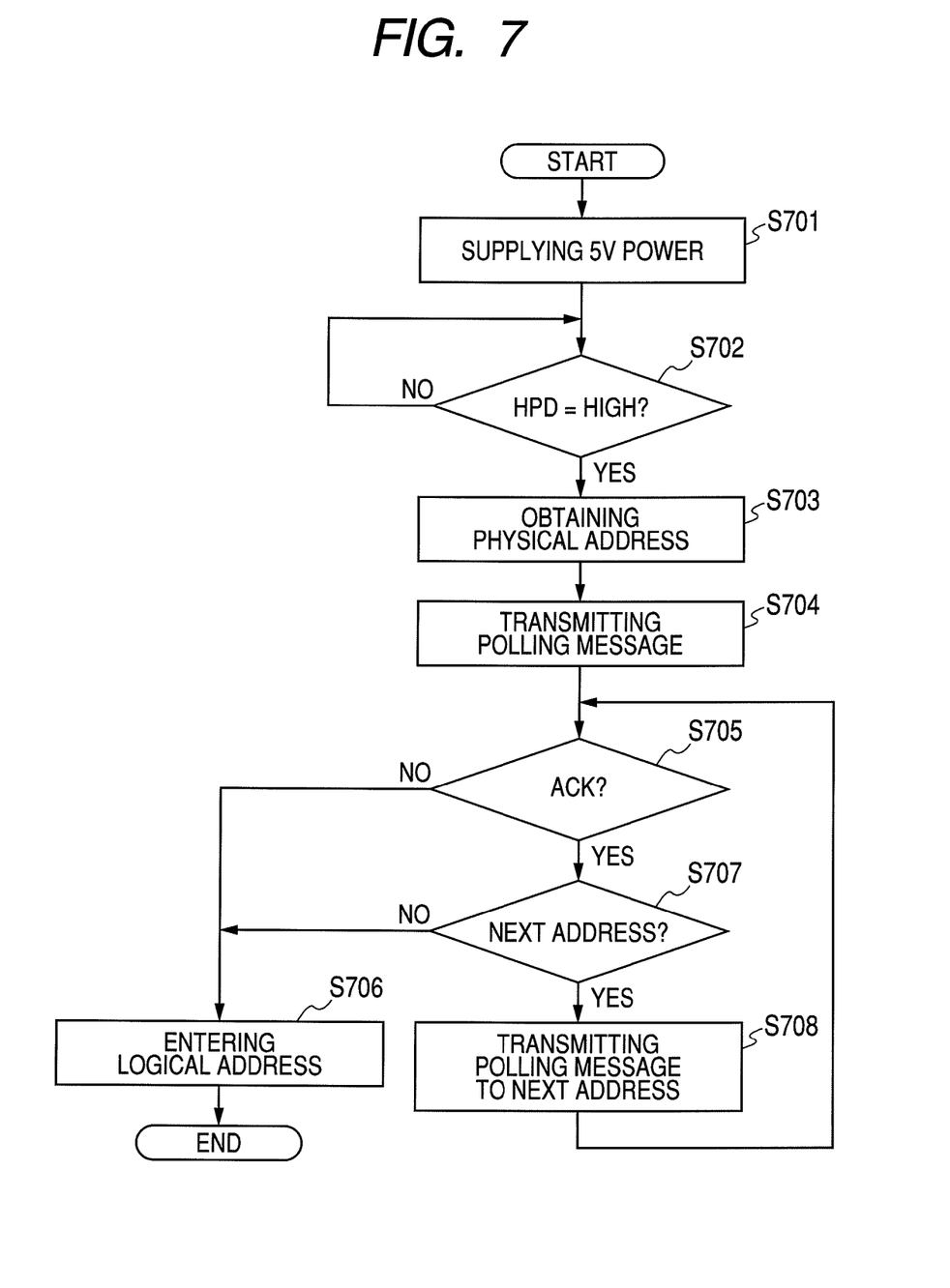
FIG. 7 is a diagram illustrating the flow of operation before address determination in the video signal output apparatus according to the first embodiment.
Figure 8:
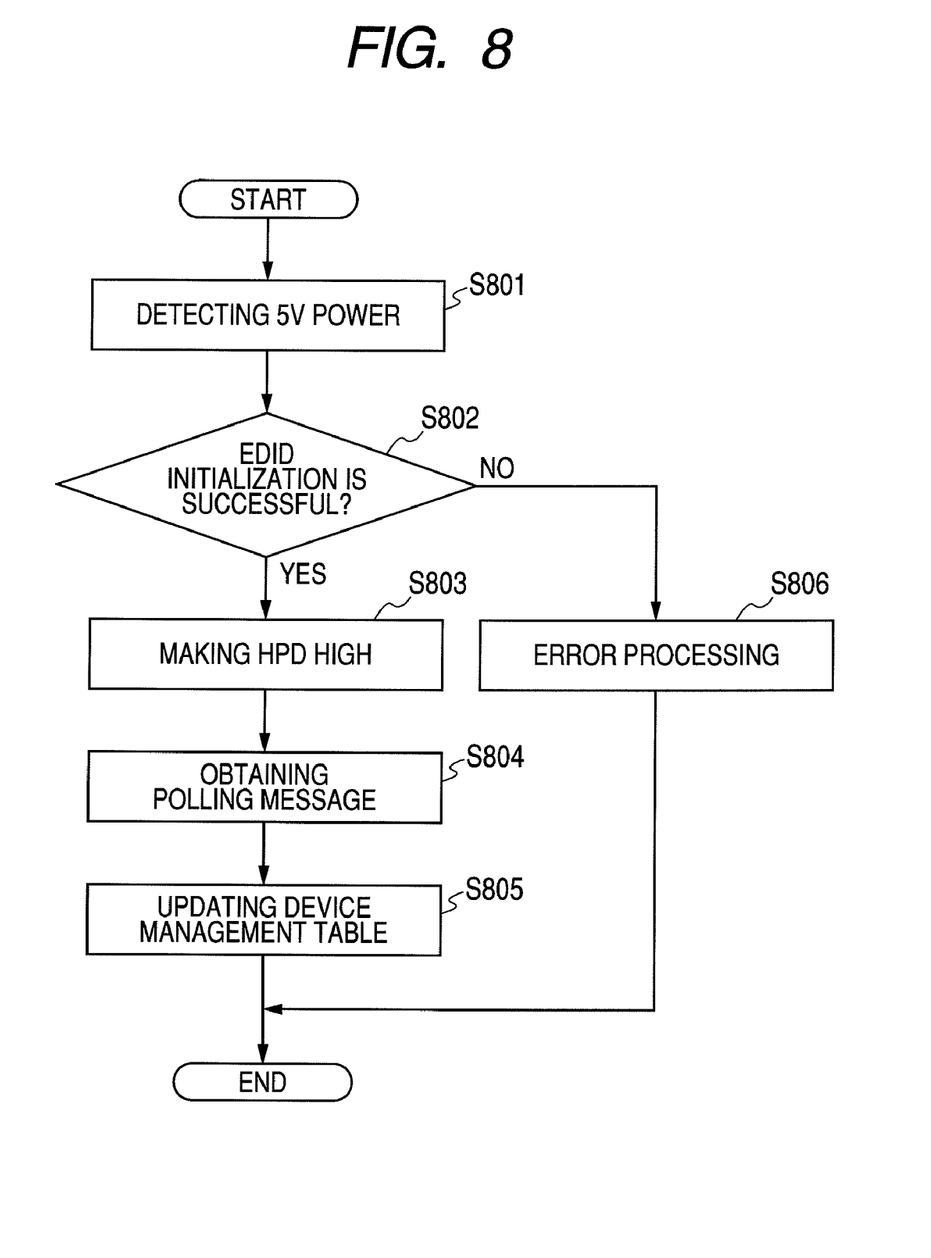
FIG. 8 is a diagram illustrating the flow of operation preparing a device management table in the video image display apparatus according to the first embodiment.

The operation from connecting the video signal output apparatuses 131 to 135 to the video image display apparatus 100 up to determination of logical addresses for device control will first be described with reference to FIGS. 7 and 8. FIG. 7 is a flowchart of processing performed by the video signal output apparatuses 131 to 135. FIG. 8 is a flowchart of processing performed by the video image display apparatus 100.

When the video signal output apparatus 131 is connected to the video image display apparatus 100, the video signal output apparatus 131 supplies the 5 V power signal (step S701).

Upon detecting supply of the 5 V power signal (step S801), the video image display apparatus 100 initializes the EDID and sets the HPD signal high (steps S802 and S803).

When the HPD signal becomes high (step S702), the video signal output apparatus 131 reads the EDID and obtains the display performance of the display apparatus and a physical address indicating the HDMI connection terminal position (step S703).

Figure 15:
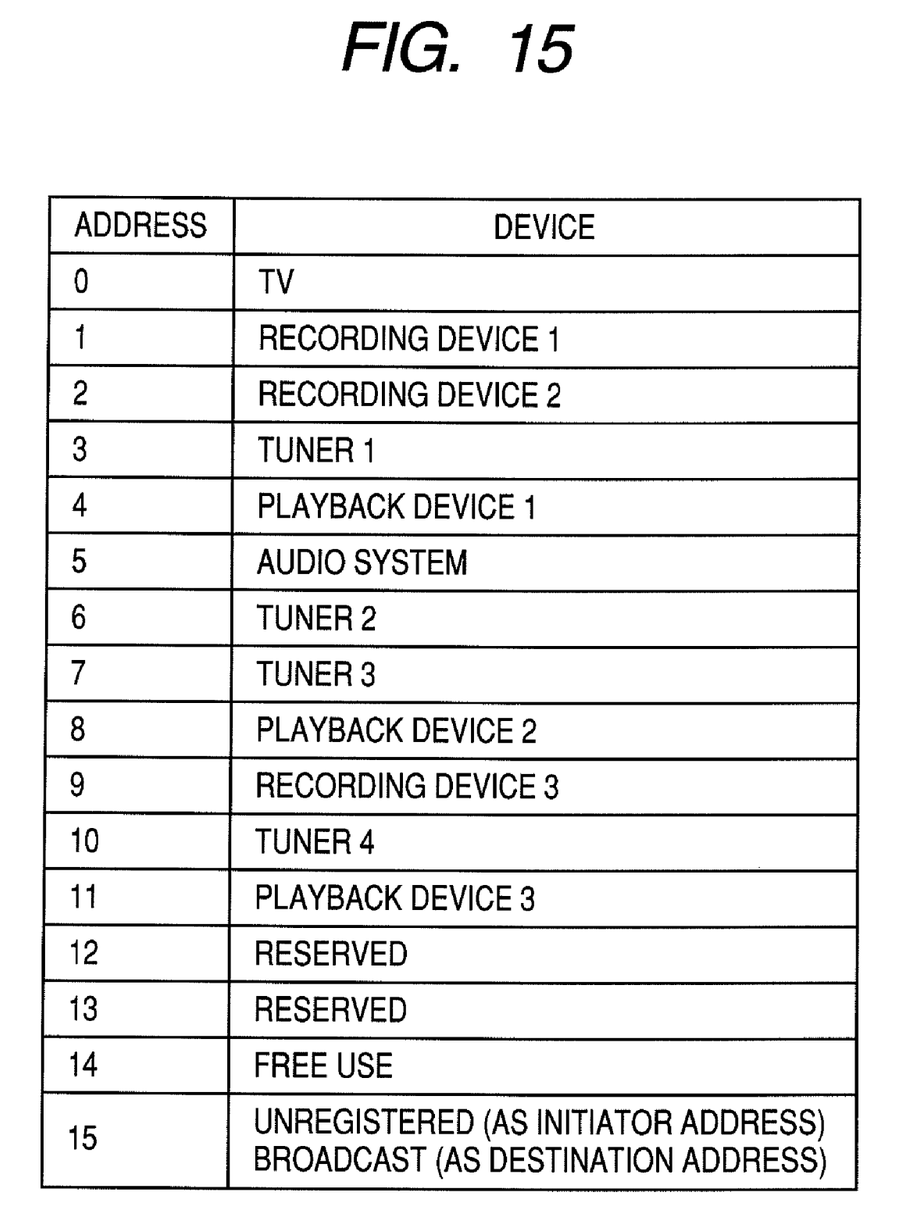
FIG. 15 is a diagram illustrating logical addresses and device types in the HDMI standard.

After the determination of the physical address, the video signal output apparatus 131 transmits a polling message onto the CEC line by using the logical address corresponding to the device type (step S704). If the video signal output apparatus is a camcorder, the video signal output apparatus transmits a CEC command by setting Playback Device 1 with Logical Address "4" as a source and as a destination according to FIG. 15.

In the case of no acknowledgement (Nack) (S705: NO), the video signal output apparatus holds the logical address as an address indicating itself (step S706).

If an acknowledgement (Ack) signal is returned, it can be understood that the address has already been in use by another apparatus. At this time, if the next address exists (S707: YES), the video signal output apparatus transmits the polling message to the address (step S708). More specifically, the video signal output apparatus transmits a CEC command by changing Playback Device 1 to Playback Device 2 and setting Logical Address "6" as a source and as a destination. Thus, an available (unused) logical address can be searched for by executing polling one by one with respect to logical addresses according to the device type.

In a case where no address is obtained even after transmitting the polling message to all the logical addresses indicating the same device type (S708: NO), it can be understood that there is no unused logical address. In this case, the video signal output apparatus obtains an indefinite address.

The above-described polling message can be grasped as a logical address obtaining request from the device side. Also, Nack can be grasped as a permission reply to the obtaining request, and Ack as a negative reply to the obtaining request.

Thus, the video signal output apparatus 131 obtains a logical address uniquely assigned on the device control line.

In a case where no logical address is determined even after transmission with respect to Playback Device 3, the video signal output apparatus 131 obtains a logical address (14 or 15) by setting its own address as an indefinite address.

On the other hand, the video image display apparatus 100 monitors the polling message on the CEC line (step S804). The video image display apparatus 100 stores, as a device management table, in a memory unit 118, a history before a terminal position and a logical address for of the connected apparatus are determined (step S805).

As a result of the above-described monitoring, the video image display apparatus 100 can specify the device type to be originally obtained by the device that has obtained an indefinite address.

Figure 9:
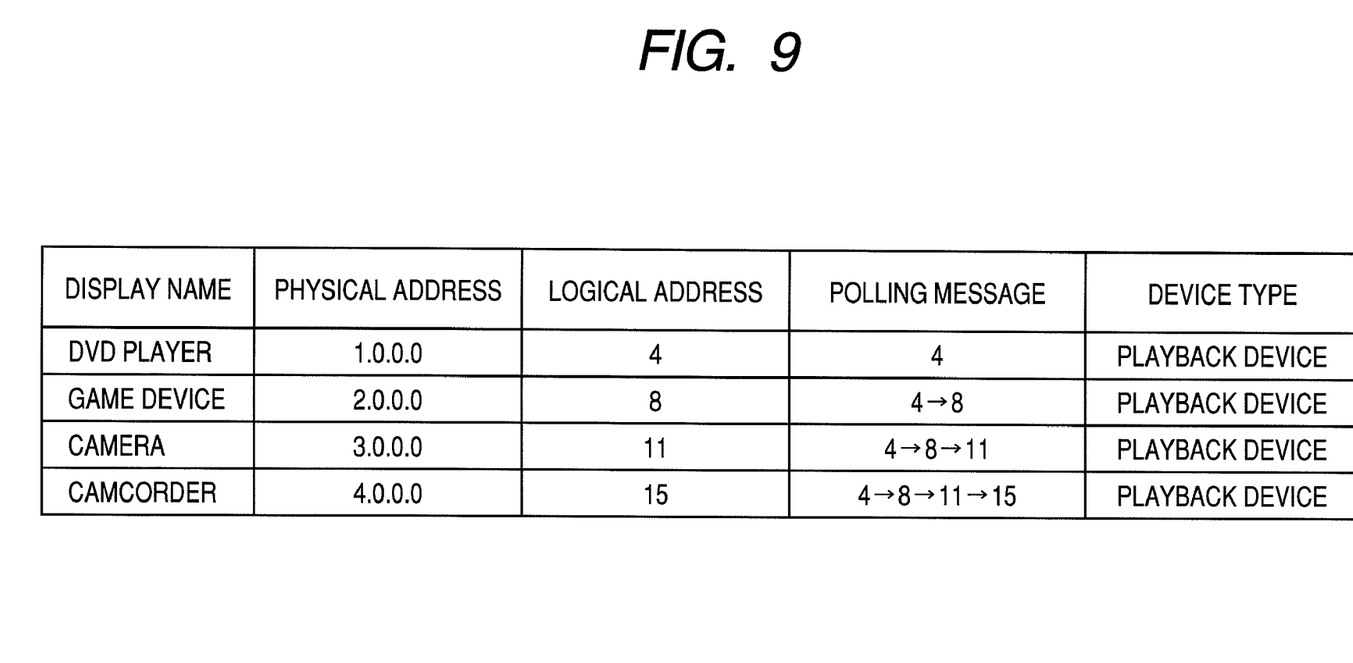
FIG. 9 is a diagram illustrating an example of the device management table according to the first embodiment.

Further, the video image display apparatus 100 can obtain a maker code and a name to be menu-displayed of the connected device via the CEC line. The video image display apparatus 100 can inquire the video signal output apparatus 131 of the method of obtaining the maker code and the name to be menu-displayed. A notice can also be sent from the video signal output apparatus 131 to the video image display apparatus 100. FIG. 9 shows an example of the device management table.

In the example shown in FIG. 9, names to be displayed, physical addresses, logical addresses, polling message histories and device types of devices are stored as the device management table. In this example, "DVD player", "Game machine" and "Camera" have succeeded in obtaining logical addresses (4, 8 and 11, respectively) corresponding to Playback Device. On the other hand, "Camcorder" has obtained an indefinite address (logical address "15"). While the device types of the former three devices can also be determined from the obtained logical addresses, the device type of "Camcorder" cannot be specified from the obtained logical address. Since by referring to the polling message history, it is found that the address corresponding to Playback Device has been obtained, thus enabling the device type of this device can be specified.

2. Logical Address Re-Obtaining Processing

Figure 10:
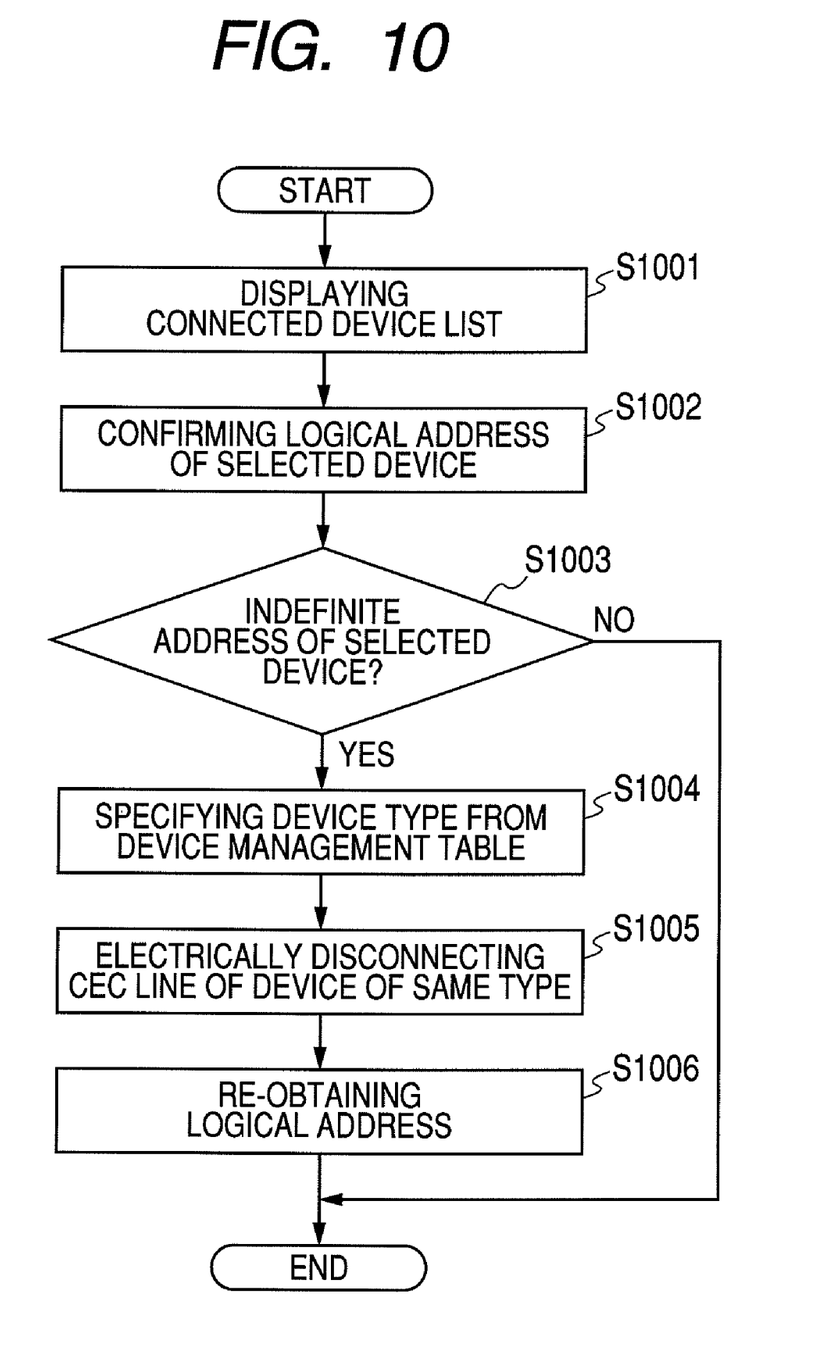
FIG. 10 is a diagram illustrating the flow of operation when the video image display apparatus according to the first embodiment makes an indefinite address device re-obtain an address.
Figure 11:
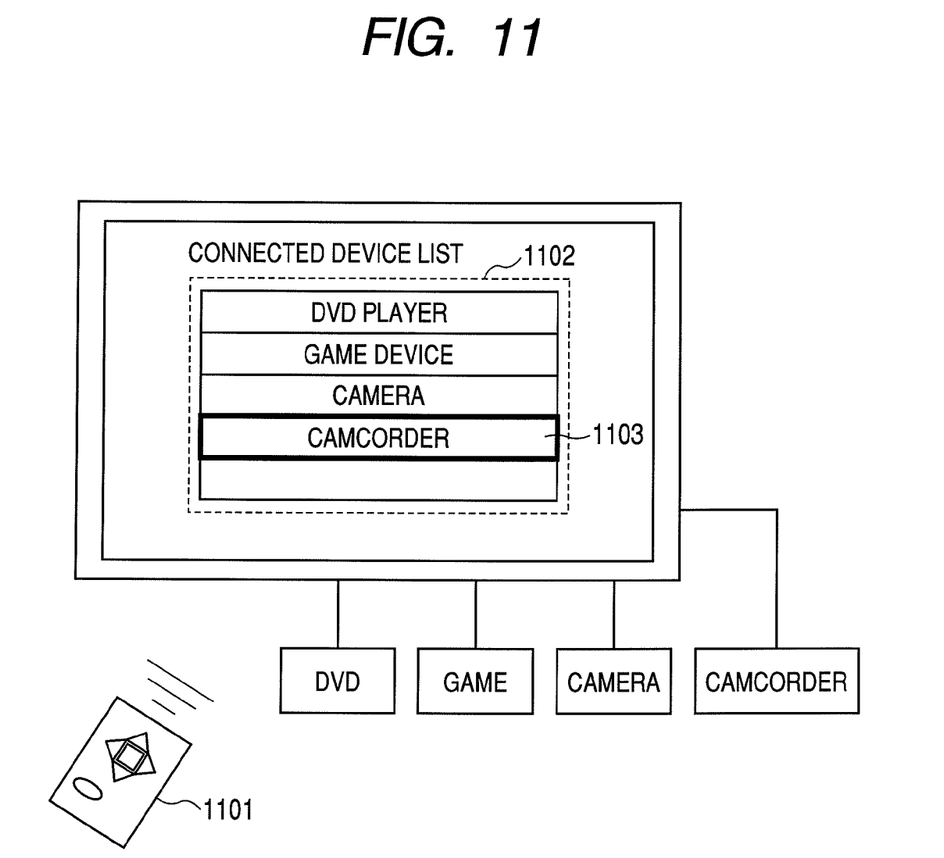
FIG. 11 is a diagram illustrating a display screen for a connected device list according to the first embodiment.

The operation from user's depressing a remote control button to making the indefinite address device (the device that has obtained the logical address "15") re-obtain an address will be described with reference to FIGS. 10 and 11.

A user first depresses a device list display button of the remote controller 1101.

The video image display apparatus 100 displays a connected device list 1102 by referring to the device management table (step S1001). The video image display apparatus 100 displays in the list not only the devices that have obtained usable logical addresses but also the device that has obtained an indefinite address unusable for device control. That is, the video image display apparatus 100 produces a list display regardless of the assigned logical addresses.

In the connected device list 1102, each device name is displayed if obtained, and the device type is displayed according to the logical address with respect to the device for which no device name has been obtained. Also, with respect to the device that has obtained an indefinite address unusable for device control, the polling message history is referred to and the device type specified from the history is displayed in the list.

The user then moves a focus 1103 on the connected device list 1102 by operating the remote controller 101 to select the device on which operation control is to be performed (corresponding to the first device of the present invention).

The video image display apparatus 100 refers to the device management table to check the logical address of the selected device (step S1002). If the selected device has an indefinite address (step S1003), the video image display apparatus 100 specifies the device type to be originally obtained by the device (step S1004).

The video image display apparatus 100 then electrically disconnects the device having the same device type and having already obtained logical addresses usable for control (corresponding to the second device of the present invention) (step S1005). This disconnection processing can be performed by the control unit 117 controlling the bus switches 121 to 125 provided in the CEC lines. In the present embodiment, if there exist a plurality of devices of the same device type as the control object device, arbitrary ones of them are disconnected.

It is also possible to disconnect the devices by setting the HPD to low. In such a case, the HPDs of the devices are temporarily set in the low state and the devices on which operation control is to be performed have the HPDs successively changed into the high state. This processing enables the device on which operation control is to be performed to obtain a usable logical address and enables the device that has already obtained a usable logical address to obtain an indefinite address.

However, there exist some of the devices which are not disconnected by only setting the HPD to low. In the present embodiment, therefore, a configuration for completely disconnecting the CEC lines by using the bus switches is adopted to enable disconnection with improved reliability.

Subsequently, the video image display apparatus 100 sets to low the HPD of the terminal to which the device selected by the user is connected and again sets the HPD to high to execute address re-obtaining processing (step S1006).

Thereafter, the device disconnected in step S1005 is connected by the bus switch, thereby being enabled to obtain an indefinite address.

Thus, even in a case where an indefinite address has been assigned to the device (first device) designated as a control object by the user, it can be attained to enable the device to re-obtain a logical address according to the device type and undergo device control.

3. Post Processing

After the completion of control on the device designated as a control object by the user, postprocessing for restoring the original logical addresses may be performed or may not be performed. The user may be enabled to determine whether or not the original logical addresses are restored.

If the original logical addresses are restored, the device that has been a control object is disconnected by the bus switch in the CEC line or by the HPD after the completion of control, and the device that has been disconnected (second device) is connected. The device that has been disconnected is thereby made to have the original logical address. The device that has been a control object is then connected to again obtain an indefinite address. It is desirable to perform such post processing and to thereby restore the original logical addresses in a case where the device designated as a control object by the user is to be temporarily controlled.

In a case where the original logical addresses are not restored, the device management table is updated. The logical address of the control object device is written from the indefinite address into the obtained address. On the other hand, the device disconnected in step S1005 (second device) has an indefinite address and the device management table is updated so as to reflect this state. Subsequent device operation processing is executed on the basis of the updated device management table.

Operation and Advantages of the Embodiment

With the above-described arrangement, a device type with an indefinite address can be specified and a device of the same device type is temporarily set aside (disconnected) to provide an unused logical address, thus enabling control of the indefinite address device. Even in a case where a number of devices larger than a predetermined upper limit number are connected, the indefinite address device can be controlled without requiring any of users of the other devices to disconnect the device, thus improving the users' convenience.

The indefinite address device is thus made CEC controllable and can therefore be displayed in a list of controllable devices no matter what the kind of logical address obtained by the device. That is, it is not necessary for the user to perform disconnection of the device, and even the need for considering whether or not the device has obtained an indefinite address is eliminated.

The description has been made by assuming that when there is no unused logical address corresponding to the device type, an indefinite address is assigned to the newly connected device. However, the present invention is not limited to this. That is, the arrangement may be such that no address is assigned to the newly connected device. In such a case, if the user attempts to control the device to which no address is assigned, the device may be made to obtain a logical address according to the device type. The same effect can also be obtained in this way.

Second Embodiment

A video image display apparatus according to a second embodiment will be described below.

In the first embodiment, the CEC bus is disconnected with respect to an arbitrarily selected device holding the same device type as a device selected by a user. In the second embodiment, a device to be disconnected is selected on the basis of the frequency of control by a user.

Figure 12:
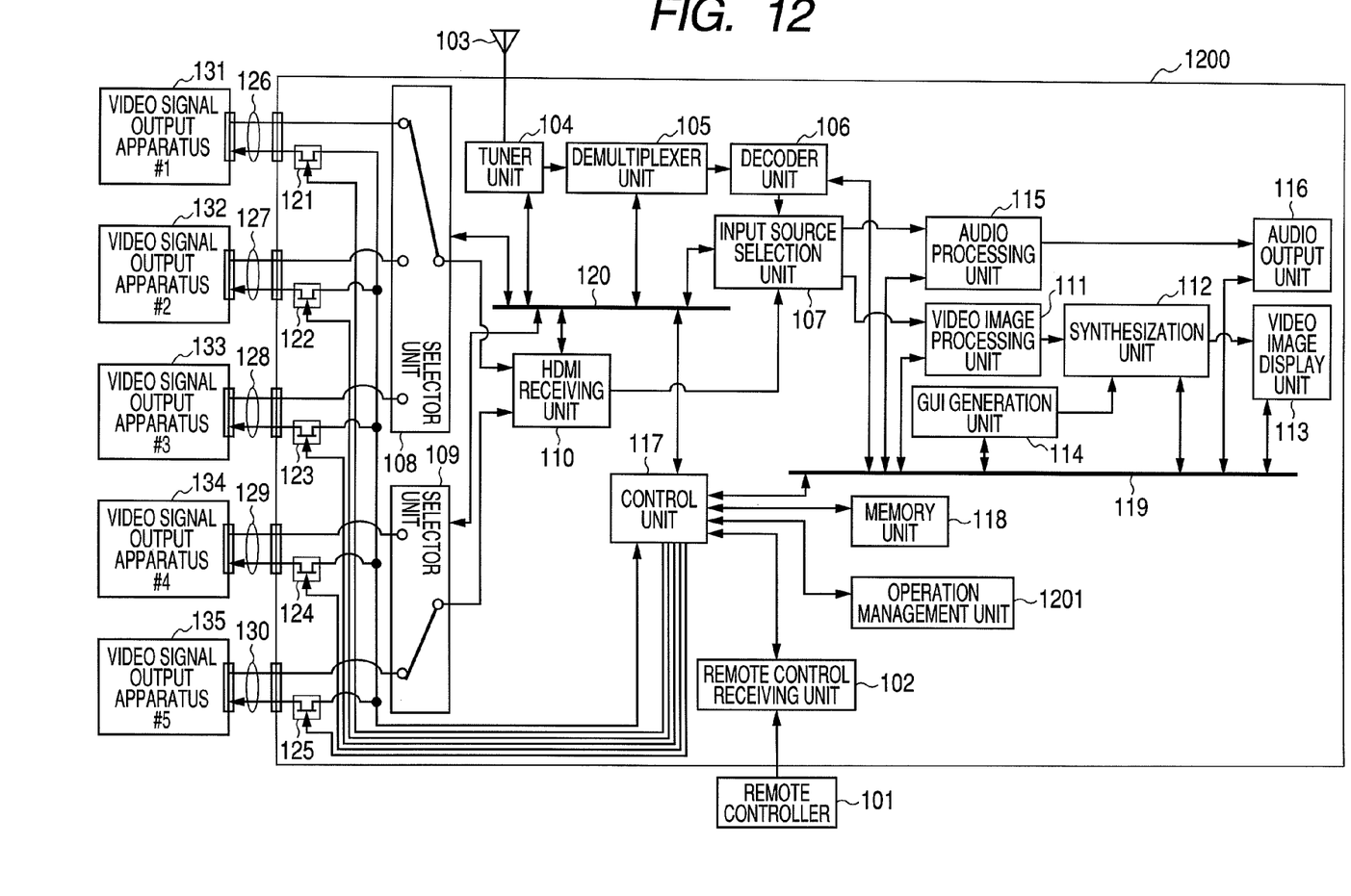
FIG. 12 is a block diagram of a video image display system according to a second embodiment.

FIG. 12 is a block diagram illustrating a video image display system in the second embodiment. The same reference numerals are used for components identical or corresponding to those in FIG. 1 and the description for such component will not be repeated.

Operation Management Unit

Referring to FIG. 12, an operation management unit 1201 manages devices provided as control objects and control frequency with respect to each device. The control frequency includes use frequency and operation frequency. Use frequency is computed on the basis of a cumulative sum of use time periods. It is preferable to compute the cumulative time period by putting a heavier weight with respect to a point in time closer to the present time. Operation frequency is obtained, after selecting a device, from the number of times the device is operated by a user under CEC control before the completion of the operation of the device. Simpler computation through the number of times the CEC command is transmitted is also possible.

Figure 13:
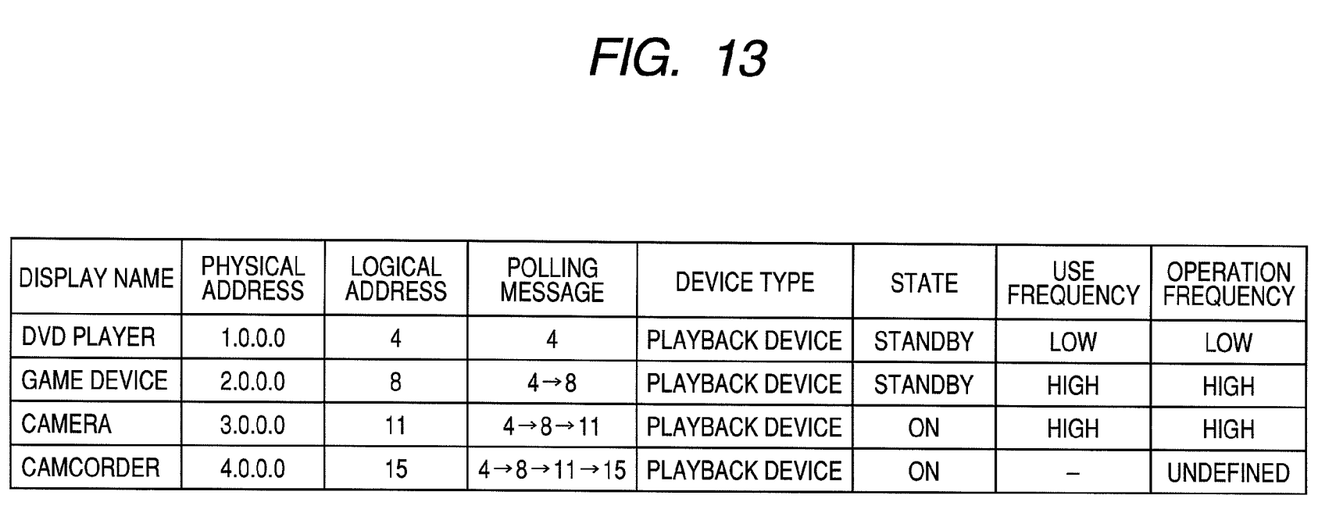
FIG. 13 is a diagram illustrating an example of a device management table according to the second embodiment.

FIG. 13 illustrates an example of a device management table including control frequency. In this example, the states of operation of the devices are also included as well as use frequency and operation frequency.

Logical Address Re-Obtaining Processing

Figure 14:
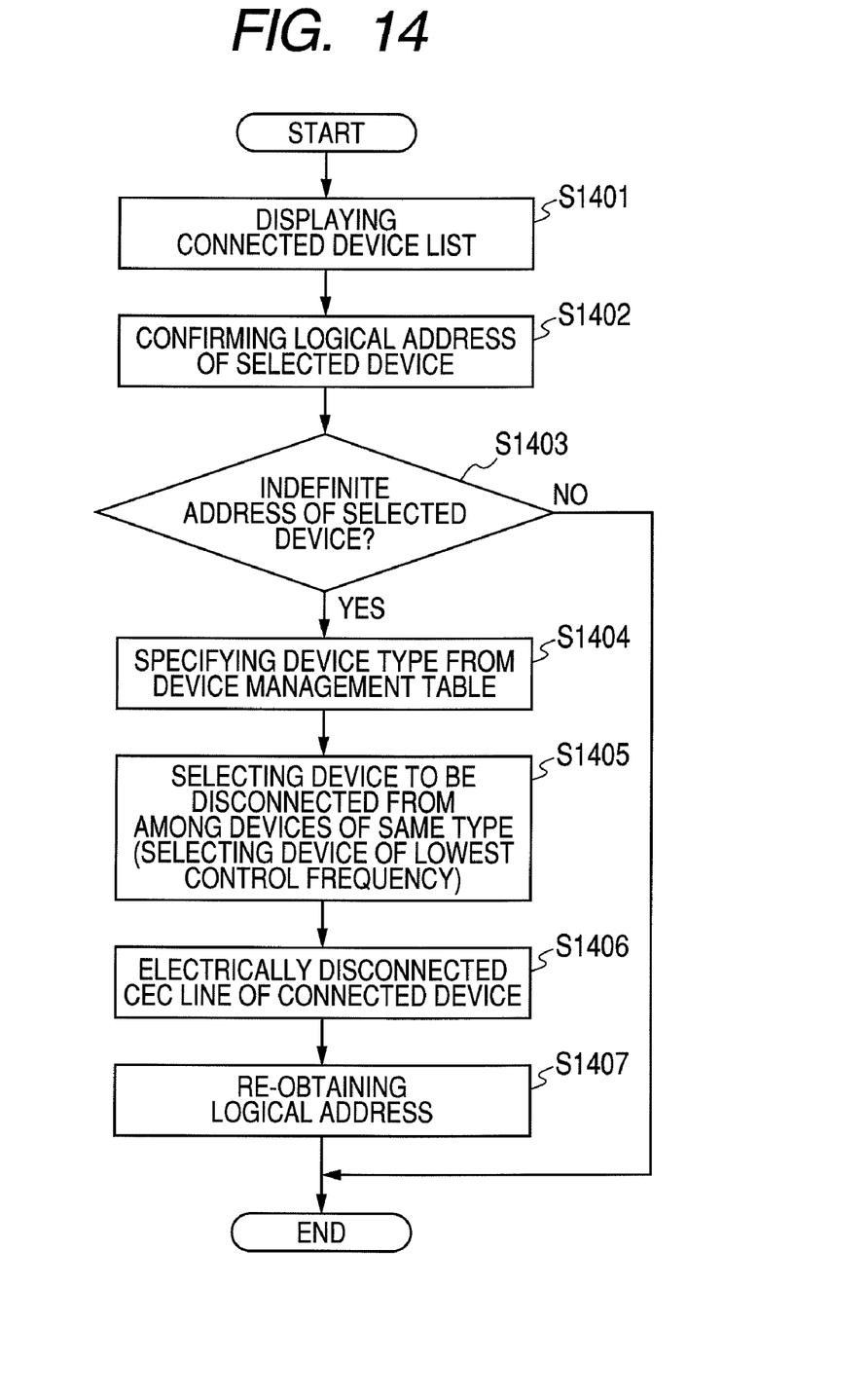
FIG. 14 is a diagram illustrating the flow of operation when the video image display apparatus according to the second embodiment makes an indefinite address device re-obtain an address.

The operation from user's depressing a remote control button to making an indefinite address device re-obtain an address will be described with reference to FIG. 14.

A user first depresses the device list display button of the remote controller 101.

The video image display apparatus 1200 displays the connected device list 1102 by referring to the device management table (step S1401). The video image display apparatus displays in the list not only devices that have obtained controllable logical addresses but also a device that has obtained an indefinite address unusable for device control.

The user then moves the focus 1103 on the connected device list by operating the remote controller to select the device on which operation control is to be performed.

The video image display apparatus 1200 refers to the device management table to check the logical address of the selected device (step S1402). If the selected device has an indefinite address, the video image display apparatus 1200 specifies the device type of the device (steps S1403 and S1004).

In the second embodiment, a device to be disconnected is selected from devices of the same device type as the control object device (step S1405).

More specifically, the operation state of each device is first referred to (FIG. 13). For example, in a case where the device is a playback device in reproduction operation, there is still a possibility of being operation-controlled in two-view display or the like and the device is not selected as an object to be disconnected. Also in a case where the device is a recording device in recording operation such that the possibility of continuing the operation of the device is high, the device is not selected as an object to be disconnected. If the device is in a standby state, it is selected as a disconnection candidate device.

In a case where a plurality of disconnection candidate devices exist, the use frequency and the operation frequency are referred to. One of the devices having a lower use frequency and a lower operation frequency is selected to be disconnected. In the present embodiment, the operation frequency and the use frequency are referred to in this order. This is because leaving one having a higher CEC operation frequency is more advantageous in avoiding impairing user operability.

In a case where the use frequency and the operation frequency are equal to each other, the highest priority is given to control of the device selected by the user in selecting one of the devices to be disconnected similarly to the first embodiment.

The device selected to be disconnected by the above-described determination is electrically disconnected (step S1406).

Subsequently, the video image display apparatus sets to low the HPD of the terminal to which the device selected by the user is connected and again sets the HPD to high to execute address re-obtaining processing (step S1407).

In a case where the 5 V power supply is stopped by stoppage of video signal input from the video signal output apparatus, insert/pulling-out a plug into/from an outlet, or power on/off, the video image display apparatus cancels the electrical disconnection of the CEC bus and executes address re-obtaining processing on the device that has been disconnected.

With the above-described arrangement, a device type with an indefinite address can be specified and a device of the same device type is temporarily set aside (disconnected) to provide an unused logical address, thus enabling control of the indefinite address device. Even in a case where a number of devices larger than a predetermined upper limit number are connected, the indefinite address device can be controlled without requiring any of users of the other devices to disconnect the device, thus improving the users' convenience.

Further, a device to be disconnected is determined on the basis of the use frequency and the operation frequency and, therefore, a device with a low probability of being used by a user is disconnected, thus avoiding impairing users' convenience.

Also, with respect to the electrically disconnected device, the desirable convenience in the case of using the device next time is ensured by performing address re-obtaining processing when use of the indefinite address device is terminated. While the description has been made with respect to a case where only one indefinite address device is connected, a case where a plurality of indefinite address devices are connected is conceivable. In such a case, when a user attempts to control one of the indefinite address devices, the indefinite address devices in a plurality of devices of the same device type as the control object device are excluded from objects to be disconnected. That is, a selection of a disconnection object device is made only from the devices to which logical addresses according to the device type are assigned, naturally because when one of the indefinite address devices is disconnected, a logical address according to the device type cannot be newly assigned to the control object device.

Other Embodiments

While the description has been made by way of example with respect to a camcorder which is a playback device (re-production device) in the above-described embodiments, device control can be performed on other types of devices such as a recording apparatus and a tuber by performing address assignment in the same manner.

The embodiments have been described with respect to an HDMI system by way of example. However, it can be easily understood that the present invention can also be applied to other similar system without limiting the application of the above-described technique to the HDMI system.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-138344, filed May 27, 2008, which is hereby incorporated by reference in its entirety.

The invention claimed is:

1. A device control apparatus comprising:
   a detection unit that detects whether or not a first logical address relating to a device type of a first device is obtained by the first device if the first device and the device control apparatus are connected; and
   a control unit that causes the first device to obtain a second logical address obtained by a second device by performing a predetermined process if the second device and the device control apparatus are connected and the first logical address is not obtained by the first device,
   wherein the predetermined process includes a process for disconnecting a connection between the second device and the device control apparatus, and
   wherein the second logical address is related to a device type of the first device.

2. A device control method comprising:
   detecting whether or not a first logical address relating to a device type of a first device is obtained by the first device if the first device and a device control apparatus are connected; and
   causing the first device to obtain a second logical address obtained by a second device by performing a predetermined process if the second device and the device control apparatus are connected and the first logical address is not obtained by the first device,
   wherein the predetermined process includes a process for disconnecting a connection between the second device and the device control apparatus, and
   wherein the second logical address is related to a device type of the first device.

3. The device control apparatus according to claim 1, wherein the predetermined process includes a process for disconnecting a connection between the second device and the device control apparatus via CEC (Consumer Electronics Control).

4. The device control apparatus according to claim 1, wherein the predetermined process includes a process for disconnecting a connection between the second device and the device control apparatus by using HPD (Hot Plug Detect).

5. The device control apparatus according to claim 1, wherein the control unit controls a HPD (Hot Plug Detect) connection between the first device and the device control apparatus to cause the first device to obtain the second logical address after the predetermined process is performed.

6. The device control apparatus according to claim 1, wherein the control unit changes a HPD (Hot Plug Detect) relating to the first device from low to high after the predetermined process is performed.

7. The device control apparatus according to claim 1, wherein a frequency of use of the second device is not higher than a frequency of use of another device.

8. The device control apparatus according to claim 7, wherein the frequency of use of the second device is detected by using a number of times that a CEC (Consumer Electronics Control) command is used.

9. The device control apparatus according to claim 1, wherein the control unit controls the first device by using one of the first logical address and the second logical address.

10. The device control apparatus according to claim 1, wherein the predetermined process is not performed if the first logical address is obtained by the first device.

11. The device control apparatus according to claim 1, wherein the device control apparatus conforms to an HDMI (High Definition Multimedia Interface) standard.

12. The device control apparatus according to claim 1, wherein the first device includes one of a playback device, a recording device, and a tuner device.

13. The device control apparatus according to claim 1, wherein the first logical address includes a logical address relating to a playback device.

14. The device control apparatus according to claim 1, wherein in a case where (a) the logical address obtained by the first device, before the control unit causes the first device to obtain the second logical address, is equal to 15, representing an indefinite logical address, and (b) the second logical address is selected from the group consisting of 4, 8, and 11, then the control unit performs the predetermined process, thereby causing (i) disconnection of the connection between the second device and the device control apparatus and (ii) obtaining by the first device of the second logical address selected from the group consisting of 4, 8, and 11.

* * * * *